Aug. 4, 1936.  D. R. SCHOLES  2,050,129
WIND WHEEL FOR WINDMILLS
Original Filed Dec. 29, 1933
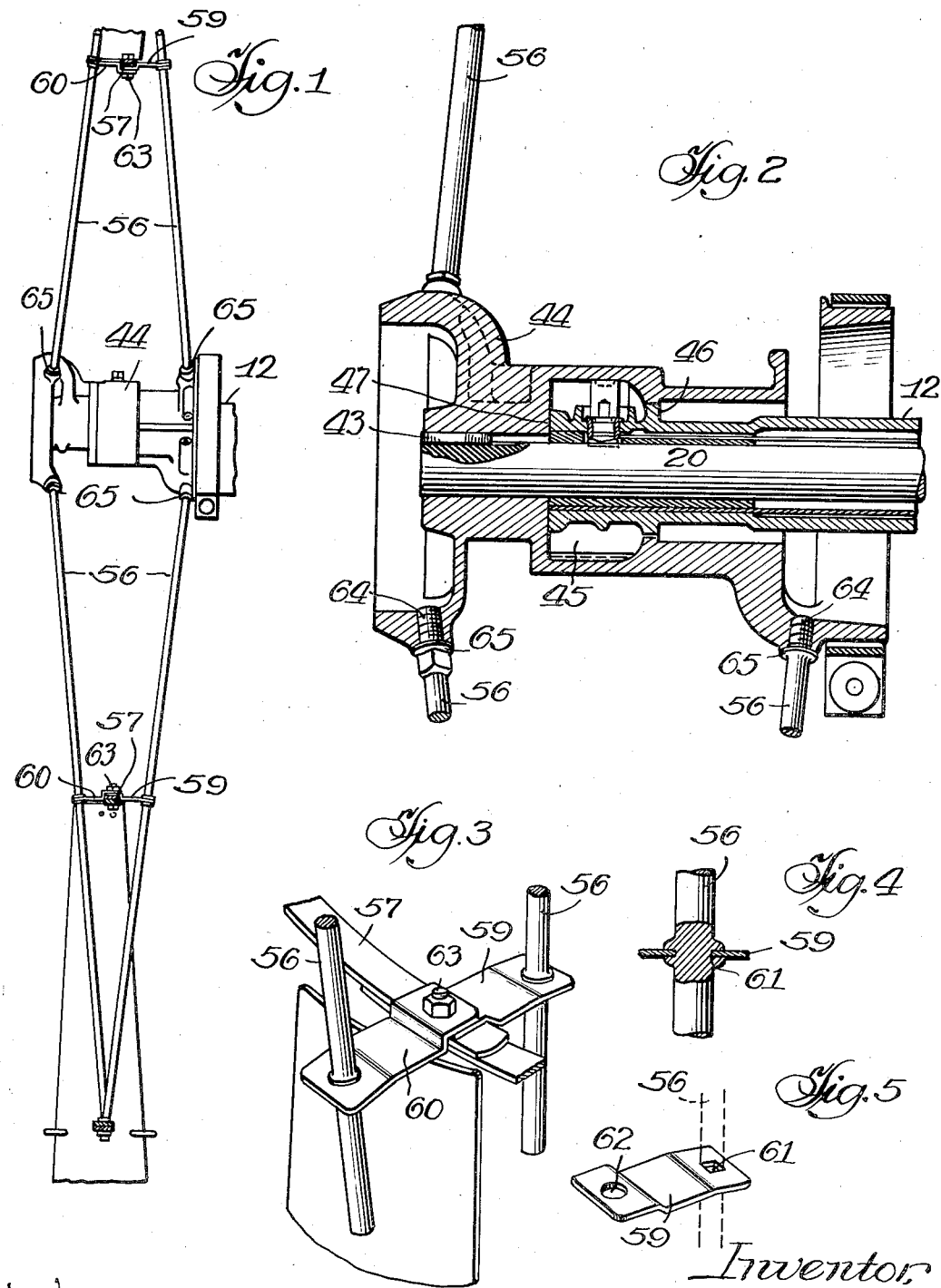
Inventor
Daniel R. Scholes
By Parkinson + Lane, Attys.

Patented Aug. 4, 1936

2,050,129

UNITED STATES PATENT OFFICE 2,050,129

WIND WHEEL FOR WINDMILLS

Daniel R. Scholes, Oak Park, Ill., assignor to Aermotor Company, Chicago, Ill., a corporation of Illinois Original application December 29, 1933, Serial No. 704,428. Divided and this application April 12, 1935, Serial No. 15,995

6 Claims. (Cl. 170—79)

This invention relates to an improved wind wheel for windmills and is a division of my application Serial No. 704,428, filed December 29, 1933.

Among the objects of my invention is to provide an improved construction of wind wheel for windmills.

A further object is to provide a novel arrangement of wind wheel arms.

Another object is to provide a novel combination and arrangement of wind wheel arms, an inner band, and arm crosses for wind wheels.

Still another object is the provision of a novel arrangement of arm crosses for wind wheels.

Other objects, advantages and capabilities will later more fully appear.

My invention further resides in the combination, construction and arrangement of parts shown in the accompanying drawing, and while I have illustrated therein preferred embodiments it is to be understood that the same are susceptible of modification and change without departing from the spirit of my invention.

In the drawing:—

Fig. 1 is a transverse vertical section with parts broken away and the hub shown in elevation, of a wind wheel embodying my invention.

Fig. 2 is a vertical longitudinal section through the hub of my wind wheel.

Fig. 3 is a perspective view of a portion of the wind wheel showing the arm crosses, the connection therewith of the wind wheel arms, and the association of these parts with the inner band of the wind wheel.

Fig. 4 is a detail view showing the connection between one of the wind wheel arms and its associated arm cross.

Fig. 5 is a detail view of one of the arm crosses showing its associated wind wheel arm in dotted lines prior to being upset into its tightened position.

Secured by a key 43, or other suitable securing means, to the outer end of shaft 20, is the hub 44 of a wind wheel. This hub has a hollow portion forming the lubricant receiving chamber 45, the hub being suitably formed to coact with flange 46 near the left-hand end of the laterally extending hollow portion 12 to form one side wall of the lubricant receiving chamber 45. The hub 44 rotates with the wind wheel and bears at face 47 against the left-hand end of the laterally extending member 12.

Referring to Fig. 1, it will be seen that wind wheel arms 56 are mounted at properly spaced distances apart in extensions of the hub 44, these wind wheel arms being arranged in pairs, the two arms of each pair being firmly secured together and to the inner band 57 of the wind wheel by arm crosses 59 and 60. These arm crosses, as shown in Fig. 3, each consist of a plate, each of which, as shown in Fig. 5, is provided at its outer end with a non-circular opening 61, through which the wind wheel arm 56 passes and is then forged to upset the metal of the arm on each side of this non-circular opening, thus causing the metal of the arm to fill the non-circular opening and be formed with a shoulder tightly bearing on each side of the plate, as shown in Fig. 4. The inner end of each of these arm cross plates 59 is formed with an opening 62, which registers with a corresponding opening in the inner end of the arm cross 60 and an opening through the inner band of the wind wheel, through which aligned openings a bolt 63 is secured to hold these parts in rigid engagement. The outer end of arm cross plate 60 is also formed with a non-circular opening similar to opening 61, through which its wheel arm 56 passes and is upset in a manner similar to that already described in connection with opening 61, and shown in Fig. 4.

It will be seen that it is of importance that when wheel arms are fastened into the hub in their final position, this position should be such as to bring the arm crosses in a proper position to align the openings and receive the bolt 63. This is effected by forming threads on the inner ends of the wheel arms, as indicated at 64 in Fig. 2, there being provided a shoulder 65 on these wheel arms in such position that when the threads 64 are screwed into their threaded openings in hub 44, this shoulder 65 will bear against the metal of the hub and the wheel arm be in proper position to bring the arm crosses 59 and 60 into proper assembly with the inner band 57 of the wind wheel to receive the bolt 63.

The pressure of the wind against the wind wheel vanes will be such as to cause hub 44, as shown in Fig. 2, to press in a right-hand direction.

Having now described my invention,

I claim:—

1. In mechanism of the class described a wind wheel having a hub, wheel arms, an inner band and arm crosses for securing the wheel arms and inner band firmly together, each of the two outer ends of the arm crosses having a non-circular opening through which the wheel arm passes, the metal of the wheel arm being upset to fill said non-circular opening and to form a shoulder on each side of the arm cross to firmly secure these parts together.

2. In mechanism of the class described a wind wheel having a hub, wheel arms, an inner band, an arm cross comprising a pair of plates, each of said plates being fixed to a wheel arm against movement thereon, each plate being formed at its inner end for overlapping engagement with said inner band, spaced threaded openings in said hub, the inner end of each of said wheel arms having corresponding threads and a shoulder whereby when the inner end of each wheel arm is fully screwed into its corresponding opening in the hub to bring the shoulder firmly against the hub the arm crosses will be in proper position to be secured to the inner band.

3. A wind wheel for windmills, comprising wheel arms arranged in pairs, each of said arms having its inner end threaded for a portion of its length, a shoulder at the end of the threaded portion farthest removed from the free end of the said portion, a hub having threaded openings into which said threaded portions are threaded, an inner band, a pair of plates fixed one to each of said arms to extend inwardly and overlap with each other and with said inner band, said shoulder being so spaced that when it contacts with said hub the pair of plates and inner band will be in proper position for securing together.

4. A wind wheel for windmills, comprising a hub, wheel arms, an inner band, arm cross plates fixed to said arms and adapted to overlap each other and said inner band, said wheel arms having threaded engagement with said hub, and means for causing said inner band and arm cross plates to be in proper assembling position when said arms are screwed to the limit into the hub.

5. A wind wheel for windmills, comprising a hub, wheel arms arranged in pairs, an inner band positioned between said arms, an arm cross positioned between the arms of each pair, said arm cross comprising a pair of plates, each of said plates being non-rotatably fixed adjacent its outer end to an arm and being formed at its inner end with an offset, the offset portions overlapping each other and the inner band, and means to secure said overlapping portions and said inner band rigidly together, whereby to provide a rigid structure with the arm cross plates rigidly secured to the inner band against any shifting or turning with relation thereto, and the outer ends of the said plates rigidly secured to the arms against any shifting or turning with relation thereto.

6. A wind wheel for windmills, comprising a hub, wheel arms arranged in pairs, an inner band positioned between said arms, an arm cross positioned between the arms of each pair, said arm cross comprising a pair of plates, each of said plates being fixed adjacent its outer end to an arm and being formed at its inner end with an offset, the offset portions overlapping each other and the inner band, and means to secure said overlapping portions and said inner band rigidly together, the arms having threads and a shoulder at one end so that when said threads are screwed into the hub until the shoulder engages the hub, the plates will be in proper position to secure to the inner band.

DANIEL R. SCHOLES.